US007861180B2

(12) United States Patent
Liu et al.

(10) Patent No.: US 7,861,180 B2
(45) Date of Patent: Dec. 28, 2010

(54) MODELESS INTERACTION WITH GUI WIDGET APPLICATIONS

(75) Inventors: Sijia Liu, Cambridge, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/426,571

(22) Filed: Apr. 20, 2009

(65) Prior Publication Data

US 2009/0217206 A1 Aug. 27, 2009

Related U.S. Application Data

(63) Continuation of application No. 10/769,002, filed on Jan. 30, 2004, now abandoned.

(51) Int. Cl.
*G06F 3/48* (2006.01)
(52) U.S. Cl. ........................ 715/763; 715/800; 715/862
(58) Field of Classification Search ................. 715/744, 715/763, 846, 800, 856, 862
See application file for complete search history.

(56) References Cited

U.S. PATENT DOCUMENTS

| 5,155,806 | A | * | 10/1992 | Hoeber et al. | 715/711 |
|---|---|---|---|---|---|
| 5,686,937 | A | | 11/1997 | Li | 345/123 |
| 5,689,718 | A | | 11/1997 | Sakurai et al. | 395/779 |
| 5,710,897 | A | * | 1/1998 | Schneider | 715/856 |
| 6,094,197 | A | | 7/2000 | Buxton et al. | 715/863 |
| 6,118,451 | A | | 9/2000 | Alexander | 345/356 |
| 6,181,325 | B1 | * | 1/2001 | Lee | 345/157 |
| 6,239,796 | B1 | | 5/2001 | Alexander | 345/339 |
| 7,036,087 | B1 | | 4/2006 | Odom | 715/779 |
| 7,168,047 | B1 | | 1/2007 | Huppi | 715/784 |
| 2002/0049481 | A1 | | 4/2002 | Conley et al. | 607/60 |
| 2002/0154173 | A1 | | 10/2002 | Etgen et al. | 345/833 |
| 2003/0011639 | A1 | | 1/2003 | Webb | 345/808 |
| 2004/0054701 | A1 | | 3/2004 | Garst | 708/131 |
| 2005/0262451 | A1 | * | 11/2005 | Remignanti et al. | 715/833 |

* cited by examiner

*Primary Examiner*—William L Bashore
*Assistant Examiner*—Henry Orr
(74) *Attorney, Agent, or Firm*—Jon A. Gibbons; Fleit Gibbons Gutman Bongini & Bianco PL

(57) ABSTRACT

A user displayed interactive GUI widget (icon) provides two or more regions. A first region provides widget manipulation function for editing the widget, editing including moving or sizing functions. A second region provides widget interaction function for user interaction with the widget including interaction lists or interaction graphics. The regions may comprise one or more icon border regions and one or more icon internal regions.

14 Claims, 12 Drawing Sheets

MODELESS INTERACTION WITH GUI WIDGET APPLICATIONS

CROSS REFERENCE TO RELATED APPLICATIONS

This is a continuation of application Ser. No. 10/769,002, filed Jan. 30, 2004, now abandoned. The entire disclosure of prior application Ser. No. 10/769,002 is herein incorporated by reference in its entirety.

FIELD OF THE INVENTION

This invention relates generally to icons and user interaction with icons on a computer system and, more particularly, to methods for creating icons which can be readily manipulated by a user to provide values directly to an underlying application pointed to by the icon.

BACKGROUND OF THE INVENTION

In many graphic interfaces there is a problem that arises in having two modes of interacting with widgets (or icons), on the screen of a user interface. A mode is a computer science term meaning the state of a program (or device). The term "mode" implies choice. One can choose to put the system in a mode by changing a setting. In this document, we use mode and state interchangeably. At times, the user wants to edit the icon and change the properties or behaviors of the icon. At other times, the user wants to interact with the icon and with the underlying application. The common solution is to allow the user to change between working modes (change states). By changing modes (switching to the first or second mode) he can either edit the icon or interact with the icon but not do both at the same time. Typically, the mode change is accomplished by initiating a keypad action or a mouse button action.

According to Webopedia on the worldwide web at www-.webopedia.com, a widget is (1) A generic term for the part of a GUI that allows the user to interface with the application and operating system. Widgets display information and invite the user to act in a number of ways. Typical widgets include buttons, dialog boxes, pop-up windows, pull-down menus, icons, scroll bars, resizable window edges, progress indicators, selection boxes, windows, tear-off menus, menu bars, toggle switches and forms. (2) The term also refers to the program that is written in order to make the graphic widget in the GUI look and perform in a specified way, depending on what action the user takes while interfacing with the GUI. The term widget is used to refer to either the graphic component or its controlling program or to refer to the combination of both.

Within this specification, we will use the term "icon" and "widget" interchangeably.

One of the problems with modal interfaces is the added cognitive expense to the user to remember to switch between the modes to do the necessary tasks. In addition, users forget which mode they are in, causing confusion and added frustration for the user. It is common practice to try to avoid (or reduce) the modes with which the user has to operate.

SUMMARY OF THE INVENTION

In order to minimizing the use of modes in an interface that allows for the editing and running of an application, this invention teaches a technique to allow the user to do either action without the need to switch between modes. This invention is illustrated in a system that uses views of icons to present the status of an underlying simulation or set of real data. Each icon represents an important parameter in the application.

In an example application, a GUI progress bar widget displays an icon indicating the volume of an audio presentation (a digital song being played on the user's computer). In a primary mode, the user can interact with the widget by dragging the progress bar (with his mouse controlled cursor) to either lengthen it or shorten it. Lengthening the bar causes the volume to be increased and shortening it decreases the volume. The user may also wish to manipulate the attributes of the GUI volume widget. Still in the primary mode, he moves the mouse controlled cursor over a border area of the widget and drags the border to enlarge the GUI widget. While still in the primary mode, he moves the mouse controlled cursor over another border area of the widget and can drag and drop the widget to another location of his display screen.

Another type of widget is a GUI list widget. The list widget provides a list of text items for interacting with the widget. An example would be for a list that comprised "Volume", "Base", and "Fade" audio functions. In a primary mode, the user moves his mouse controlled cursor over a text item such as "Volume" and clicks on it to select it. Still in the primary mode, the user then can type a number indicative of the value to apply to the item such as "01" for quiet and "10" for loud. The border area would work as described for the graphical widget in the primary mode. Alternatively, in the primary mode, selecting the "Volume" item may modify what the progress bar in the previous example will modify when it is manipulated.

In order to provide GUI widget manipulation (editing), the border around each icon is utilized, much like the title bar of a window in an operating system (Windows, OSX, etc.). In Windows OS, you can move a window by dragging the title bar of the window. With this invention, this idea is extended to allow the "edit" mode to be active in a thin area around the perimeter of each of the icons. The edit activities would include, but not be limited to, the selecting, moving, and resizing of the icon. In addition, a menu of operations for that icon (such as delete or copy) would be available via a right click of the mouse. The interior of the icon would be utilized to interact with the icon to communicate directly to the underlying application.

This invention utilizes the edge border to graphically enable 2 modes. This edge border can also enable other modes or other actions by including various buttons for these separate states or actions. For example, in windows, the upper right corner of the title bar includes 3 buttons by default—minimize, maximize, and close. Likewise, in the edge border we can include buttons for application dependent actions, such as delete or copy as well as icon locking (to disable the edit mode) or other buttons to switch modes like switching tabs in a tabbed widget. These additional modes can also be dynamically accessed by allowing the user to use modifier keys, instead of physical regions, to switch between modes. The region is not limited to the complete border around the icon but maybe dynamically configured so that only the edge of the icon that the mouse enters is temporarily activated as an editing region. In this way, the standard title bar functionality of a window would be available from any edge the user's cursor enters the window or widget. An alternative is to use the right mouse button to allow the user to execute an edit operation. In this variation, the user would click right and get a menu of relevant actions for the icon (move, resize, etc). In another embodiment, additional modes of input can be simultaneously used to access the different modes of interaction. For example, voice input could be used to indicate to the system when interaction versus editing operations should apply or control keys on the keyboard (control, alt, shift etc) or mouse button combinations could be used to access the different modes.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
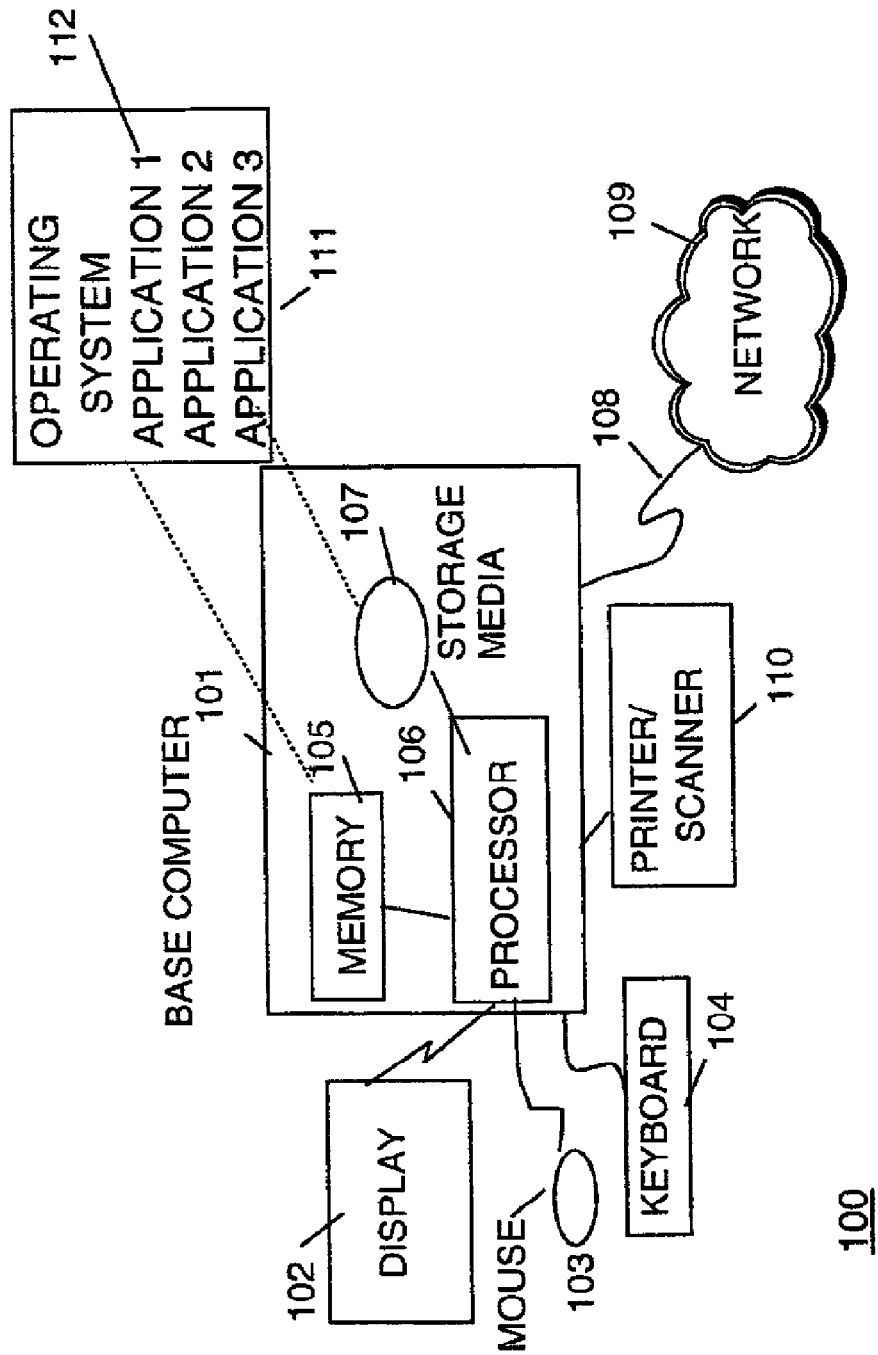
FIG. 1 depicts a computer system for implementing the present invention.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter 108 capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a local area network (LAN) or a wide area network (WAN), or the workstation 101 can be a client in a client/server arrangement with another computer, etc. All of these configurations, as well as the appropriate communications hardware and software, are known in the art.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 112 may be embodied in the memory 105, and accessed by the processor 106 using the processor bus. Such programming code includes an operating system which controls the function and interaction of the various computer components and one or more application programs 112. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 112. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Figure 2:
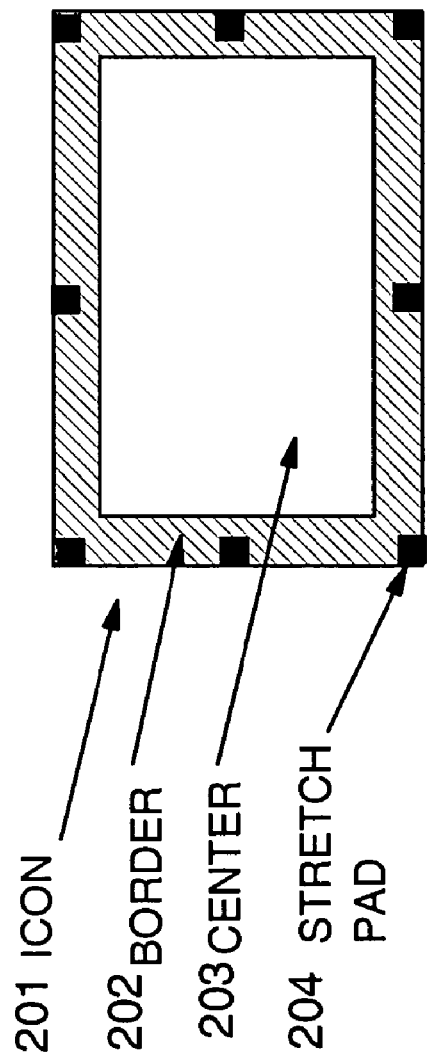
FIG. 2 depicts an example widget according to the invention.

FIG. 2 illustrates basic components of an icon, generally at 200, to support this invention. The icons illustrated herein are simplified in order to teach the invention. It should be recognized that there are many possible implementations of icons and the present invention is applicable to any of them.

An icon 201 is divided into two areas, the border region 202 and the central region 203. FIG. 2 depicts an icon illustrating the 2 regions for the user interaction. Defining the two regions as borders and central is only illustrative of ways to create regions. There are many other ways that regions might be defined in order to practice the invention. For instance, a region may be a portion of a border, a tab shape attached to the ICON, an area within the ICON, an area outside the ICON or an area made visible by cursor position just to name a few. In the present example, at the edge of the ICON, an area indicated by stretch pad 204 (dark boxes) is used by the user to resize (stretch the shape of) the icon in one embodiment. This is accomplished in one embodiment by placing the curser over the stretch pad 204 region of the border region 202 and clicking and dragging the portion of the icon in the desired direction. Moving an icon is accomplished in one embodiment by placing a curser in the border area 202 in a region between the stretch pad 204 and clicking and dragging the icon to the desired position. The central region 203 is used for interacting with the application program associated with this icon 201.

Figure 3:
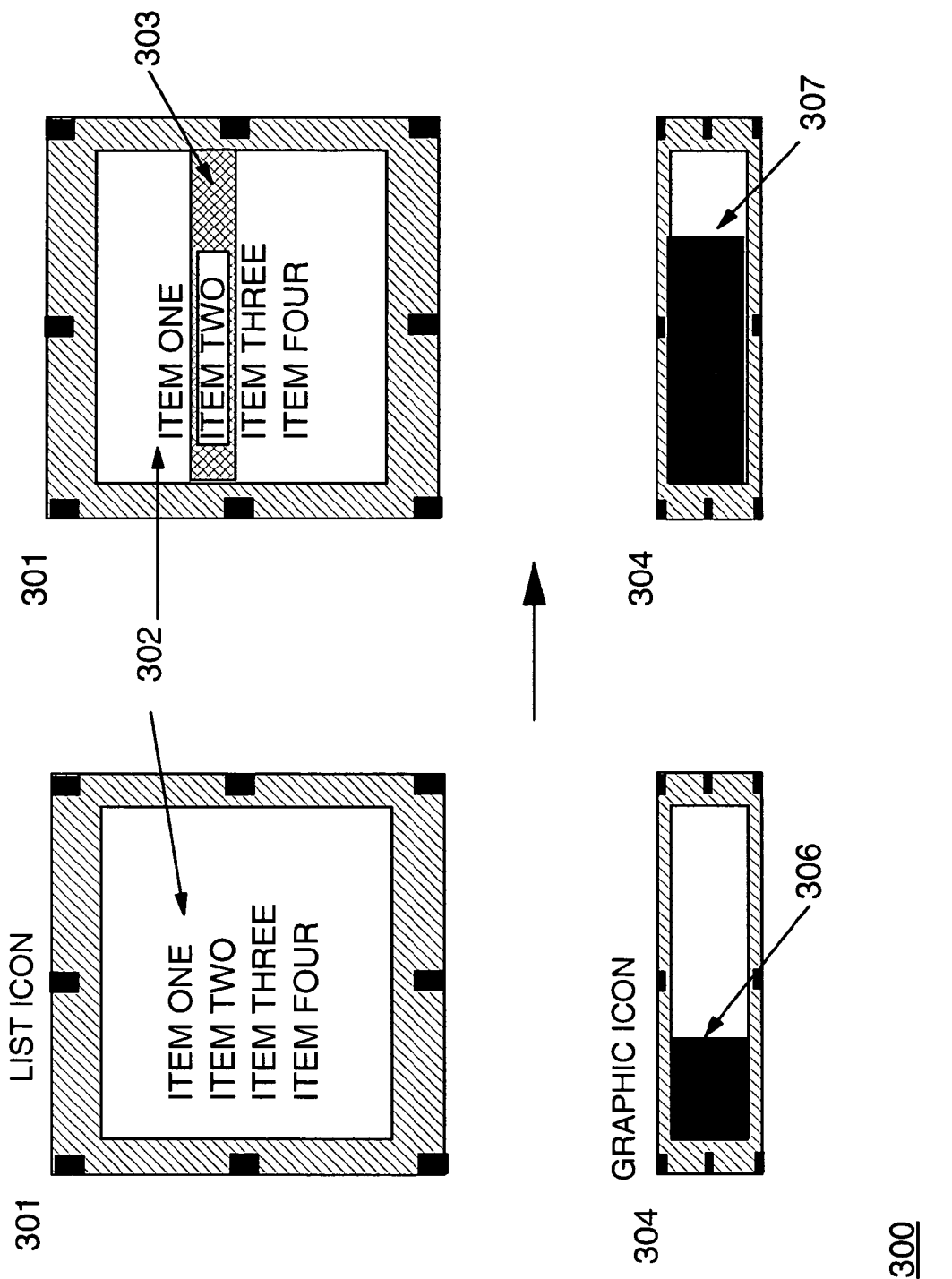
FIG. 3 depicts interaction with widgets.

FIG. 3 shows an embodiment, generally at 300, with 2 different types of icons, a list icon 301 and a progress bar icon 304. When interacting with the list 302, a row is selected 303 such as "ITEM TWO" in FIG. 3. This selection of "ITEM TWO" is not only displayed but is input to the application program function represented by the icon 301.

When interacting with the progress bar icon 304, the size of the bar is extended (or retracted). In the example the progress bar 306 is dragged to the right 307 to modify the value of the underlying application value. This change to the progress bar is not only graphically displayed 304 but is input to the application program function represented by the icon 304. During this interaction the border region exists and is continuously available to edit the properties of the icon. Additional ways to interact with the icon is through clicking, double or multiple clicking, click & dragging, keyboard input (with cursor over widget). These allow for alternative interaction techniques to modify the connected application without modifying the icons presentation properties.

Figure 4:
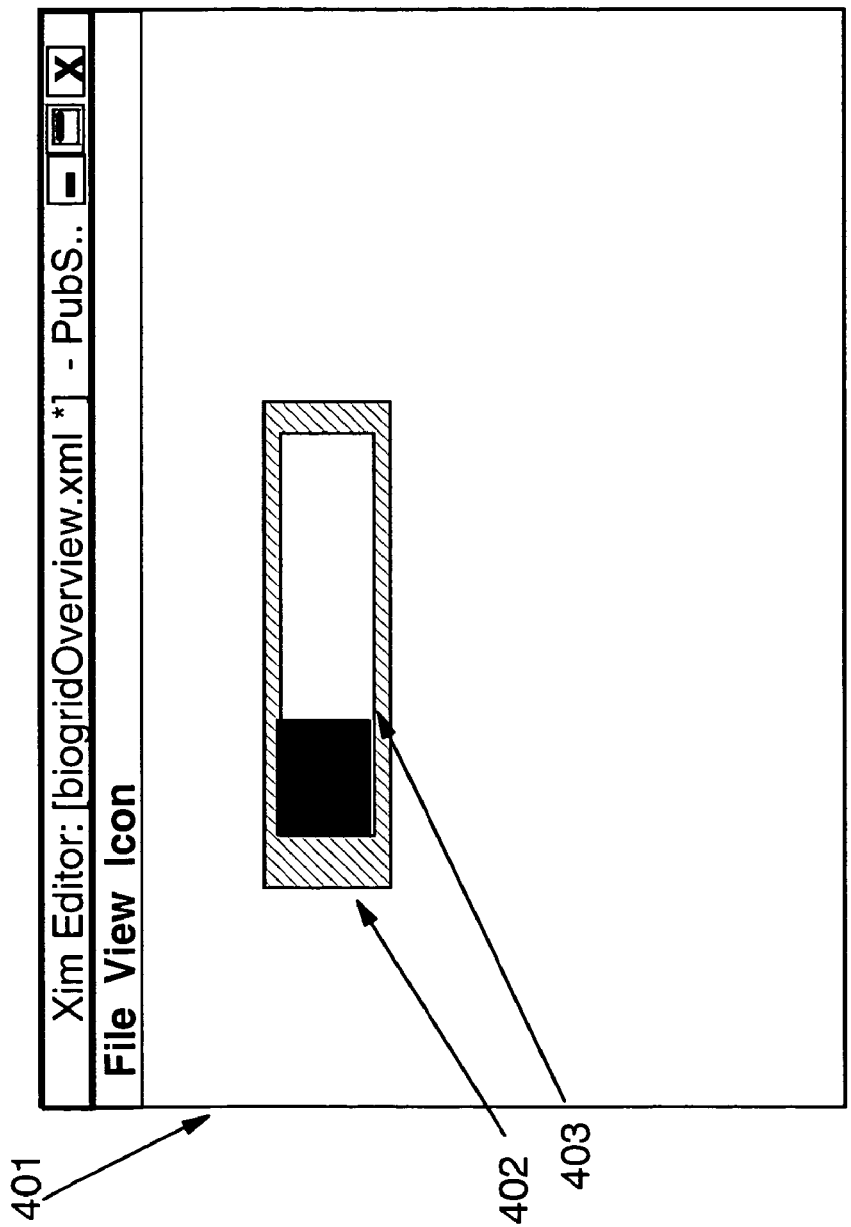
FIG. 4 depicts components of a graphical widget.
Figure 5:
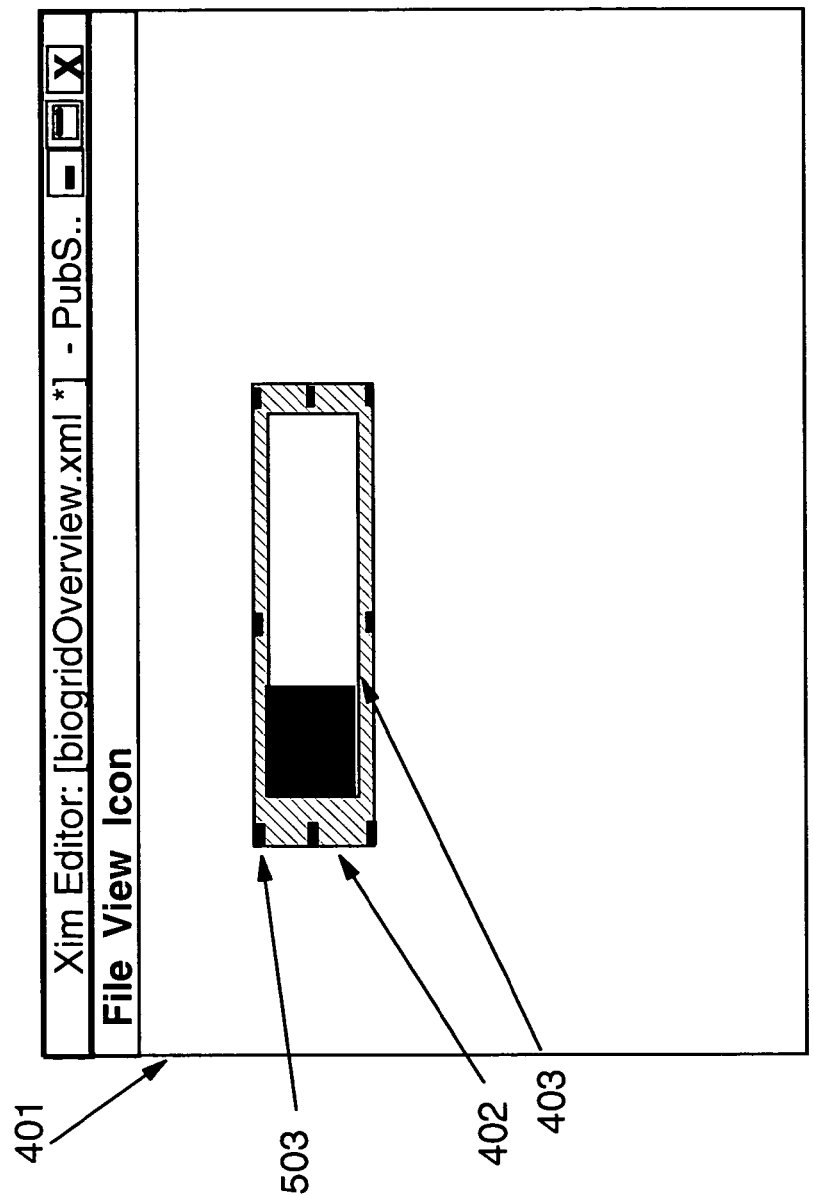
FIG. 5 depicts a widget with the border area highlighted, which happens when the cursor enters this region.

FIG. 4 depicts, generally at 400, an icon 402 in an application window 401 after creation and initially interacting with it FIG. 5 depicts, generally at 500, the icon 402 after the cursor has entered the border region 403 of the icon 402. The resize indicators 503 are visible but not prominent. The user can click on any resize indicator 503 to resize (stretch) the icon. Between the indicators 503 in the border area 403, the cursor changes to a move cursor and the user can reposition the icon 402 by clicking and dragging the icon 402. Also, a right click at any time will produce a menu of options (see FIG. 9).

Figure 6:
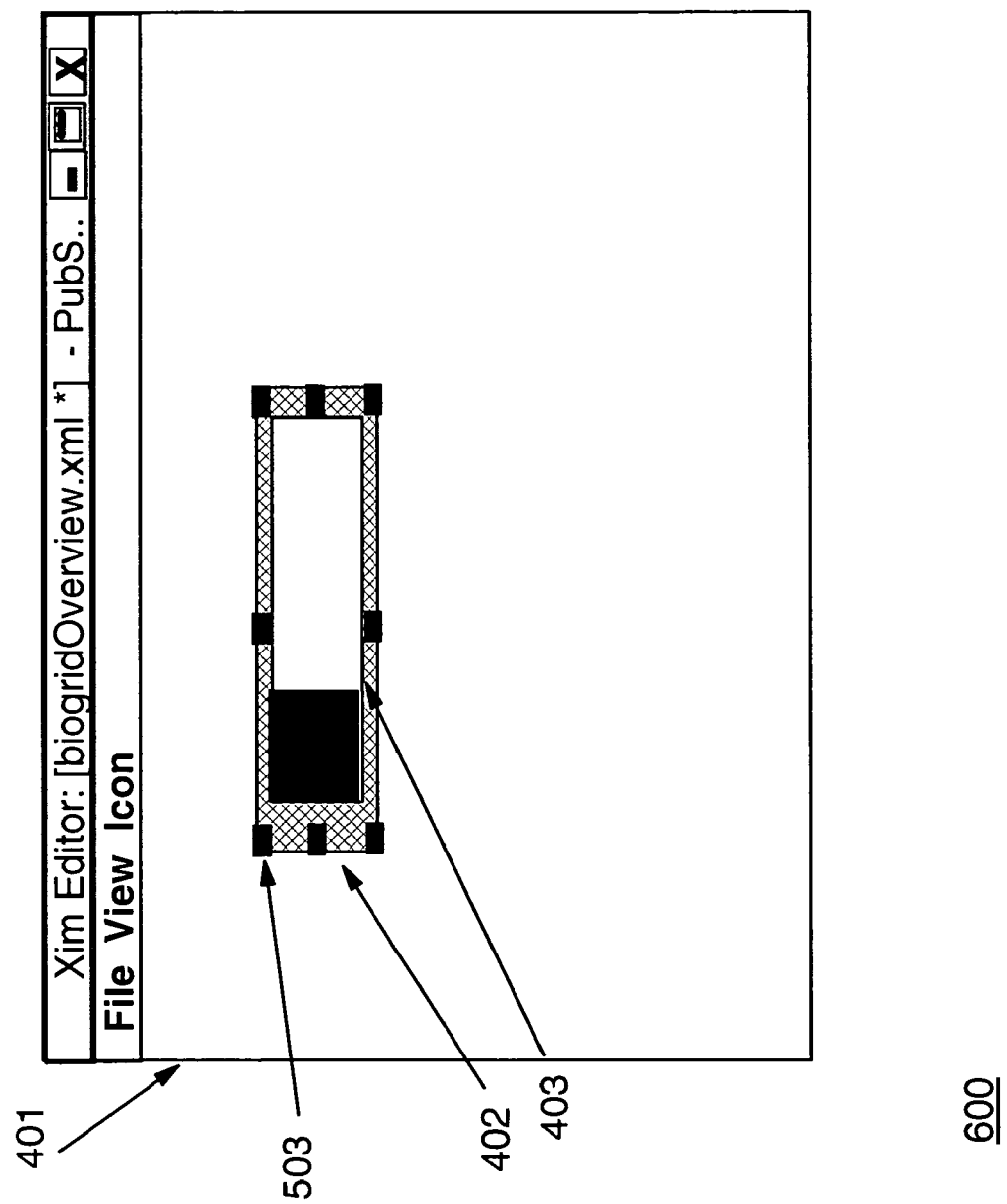
FIG. 6 depicts a widget where the widget has been selected and the border region reflects this state.

FIG. 6 shows an embodiment, shown generally at 600, which, after selecting the icon 402 by clicking on it, the resize indicators 503 and border region 403 are more prominent. With the icon 402 selected, the user can use the keyboard to move (arrow keys) or delete (delete key) the selected icon 402.

Figure 7:
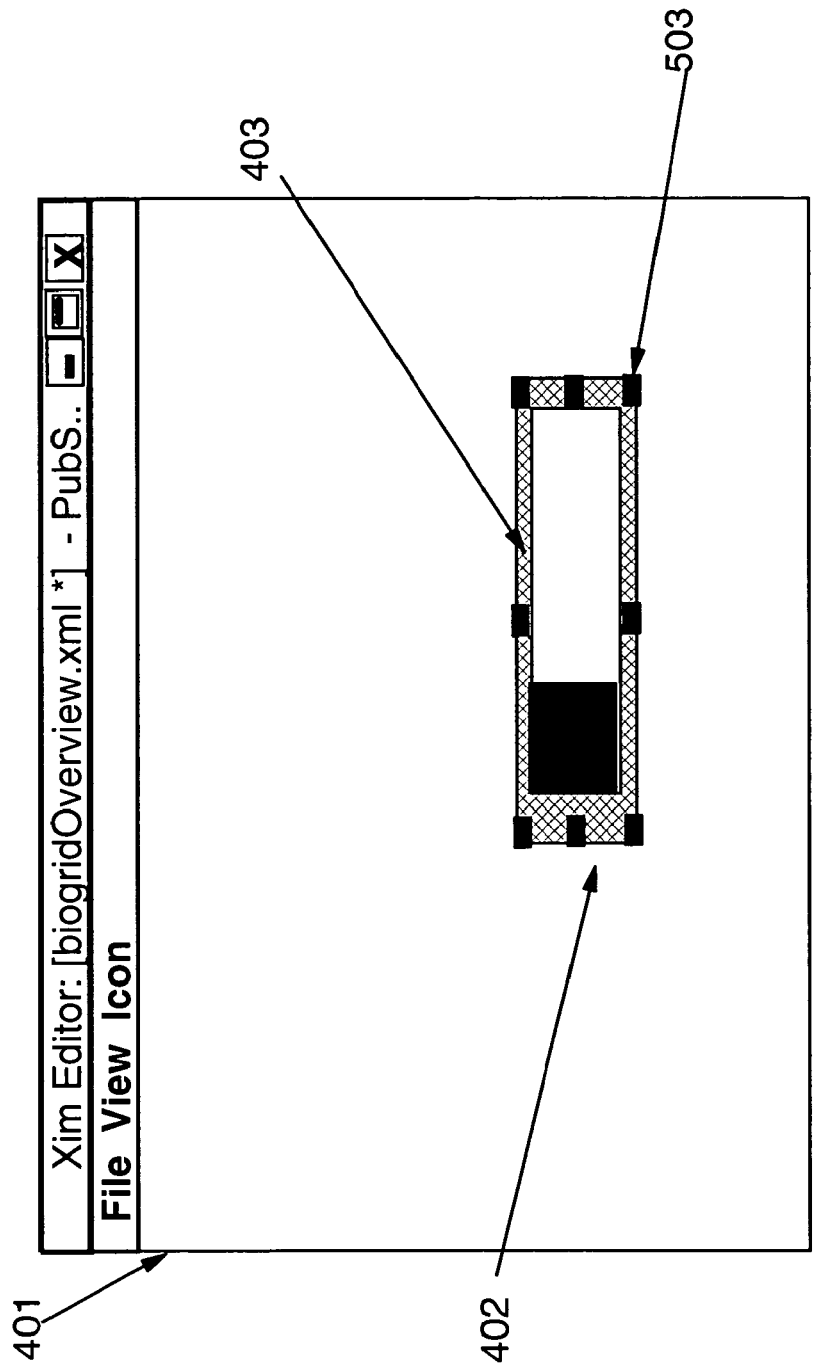
FIG. 7 depicts a widget having been dragged to a different position, and editing operation.

FIG. 7 shows an embodiment, shown generally at 700, where a user has moved the icon 402 in the edit window 401 by clicking and dragging in the border region 403 between the resize indicators 503.

Figure 8:
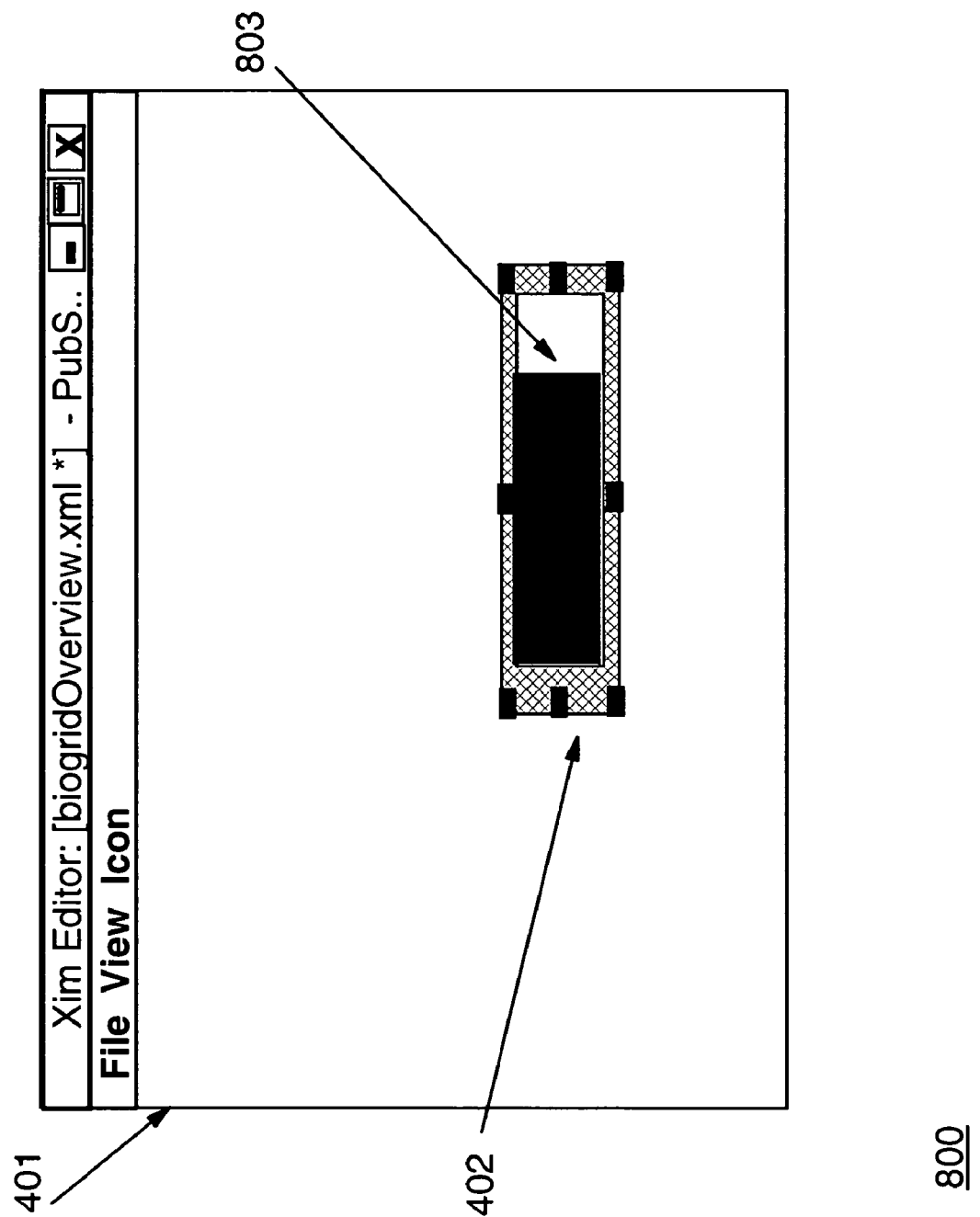
FIG. 8 depicts the result of interacting with a graphical widget, an interacting operation.

FIG. 8 shows an embodiment, shown generally at 800, where a user has clicked and dragged in the interior 803 of the icon 402, producing changes in the underlying application. Here the bar icon's value is increased by dragging to the right. In this application, the color as well as position of the bar changes with this operation.

Figure 9:
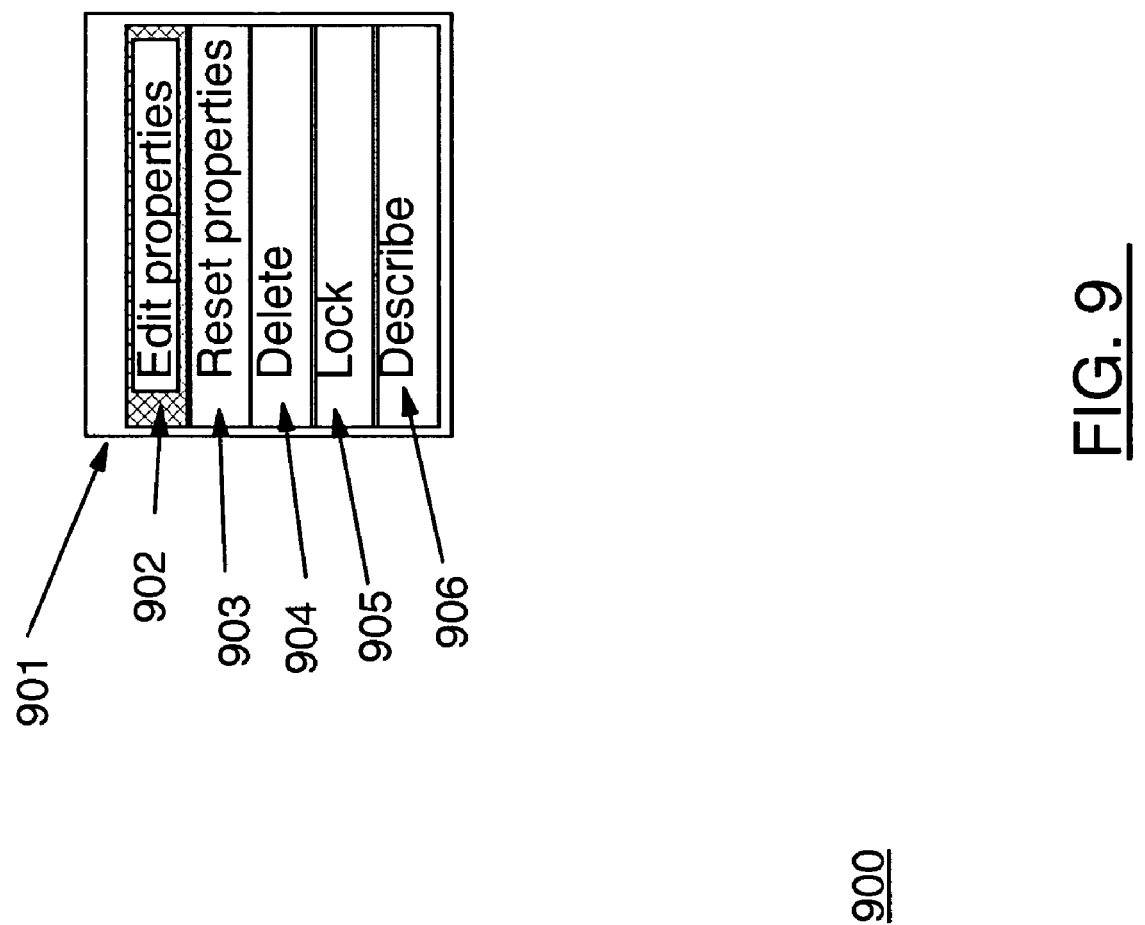
FIG. 9 depicts a widget interaction list with typical operations to perform on this widget.

FIG. 9 illustrates a right click menu 901 instantiated by right clicking with a curser placed on an icon. The menu 901 of one embodiment shown generally at 900 includes options to interact with the icon. The user can reset properties 903 of the icon and describe 906 the icon. The user can lock the icon in place by selecting the Lock item 905. When locked, the icon does not allow editing of the icon and does not show the resize indicators as the cursor moves in and out of the icon. The user can also delete 904 the icon or edit 902 the properties of the icon from this menu 901. In the example, the edit 902 function is selected and therefore highlighted.

Figure 10:
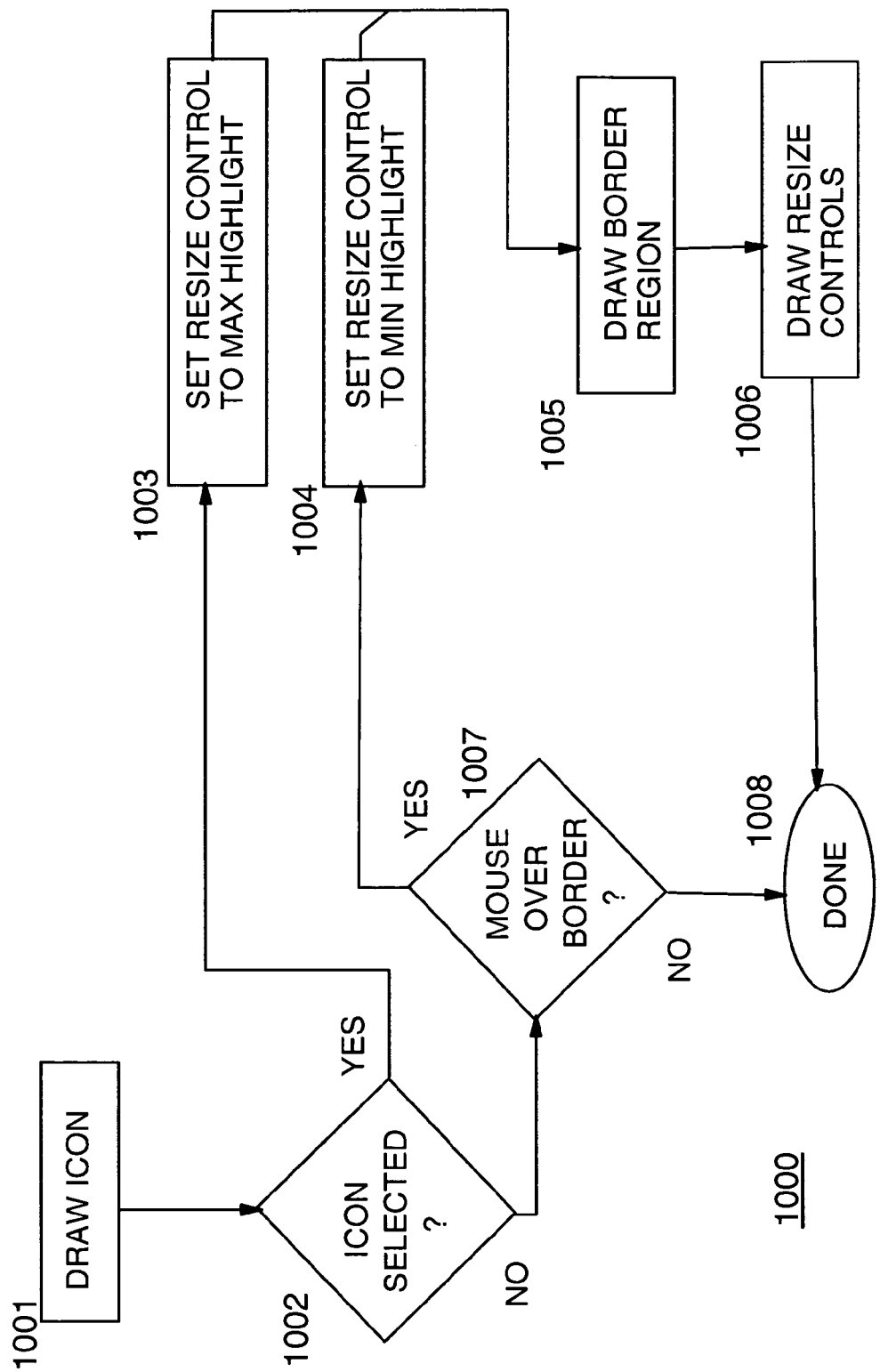
FIG. 10 is a flow depicting widget presentation with respect to the location of the cursor.

FIG. 10 illustrates the flow, shown generally at 1000, of the drawing of a typical icon with the additional requirement of drawing the border region. The icon itself is first drawn 1001 completely. Then, if the icon is selected 1002 or the mouse is over the border region 1007, the resize controls 1006 and border region 1005 are drawn. The user can set resize control to max highlight 1003, or alternatively to min highlight 1004. In addition, the cursor is updated when the mouse enters the icon. At 1008, the steps are done.

Figure 11:
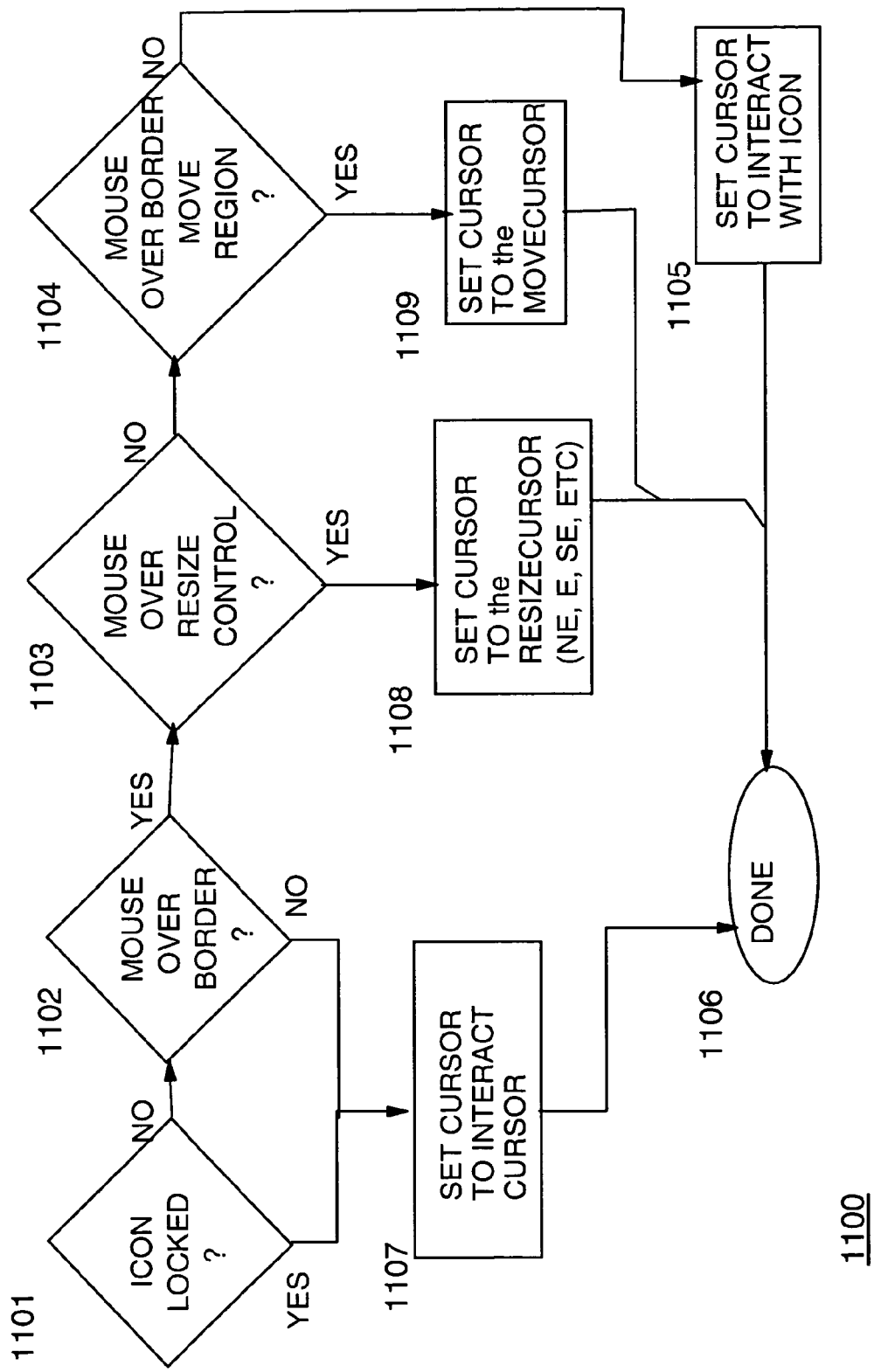
FIG. 11 is a flow depicting how the system determines the state of the cursor.

FIG. 11 illustrates an example cursor updating process, shown generally at 1100, utilized when a mouse controlled curser enters an icon. If 1101 the icon is not locked and 1102 the mouse is over the border, and 1103 the mouse is over the resize control, the cursor is able to resize the icon 1108. If the icon is locked 1101 and the mouse is not over the border 1102 then set the cursor to interact 1107. If 1104 the mouse is over the border move region the cursor is able to move 1109 the icon. If the cursor 1105 is over the icon but not in the border region, it is enabled to interact with the icon (to provide input to the application program via the icon GUI). At 1106, the process is done.

Figure 12:
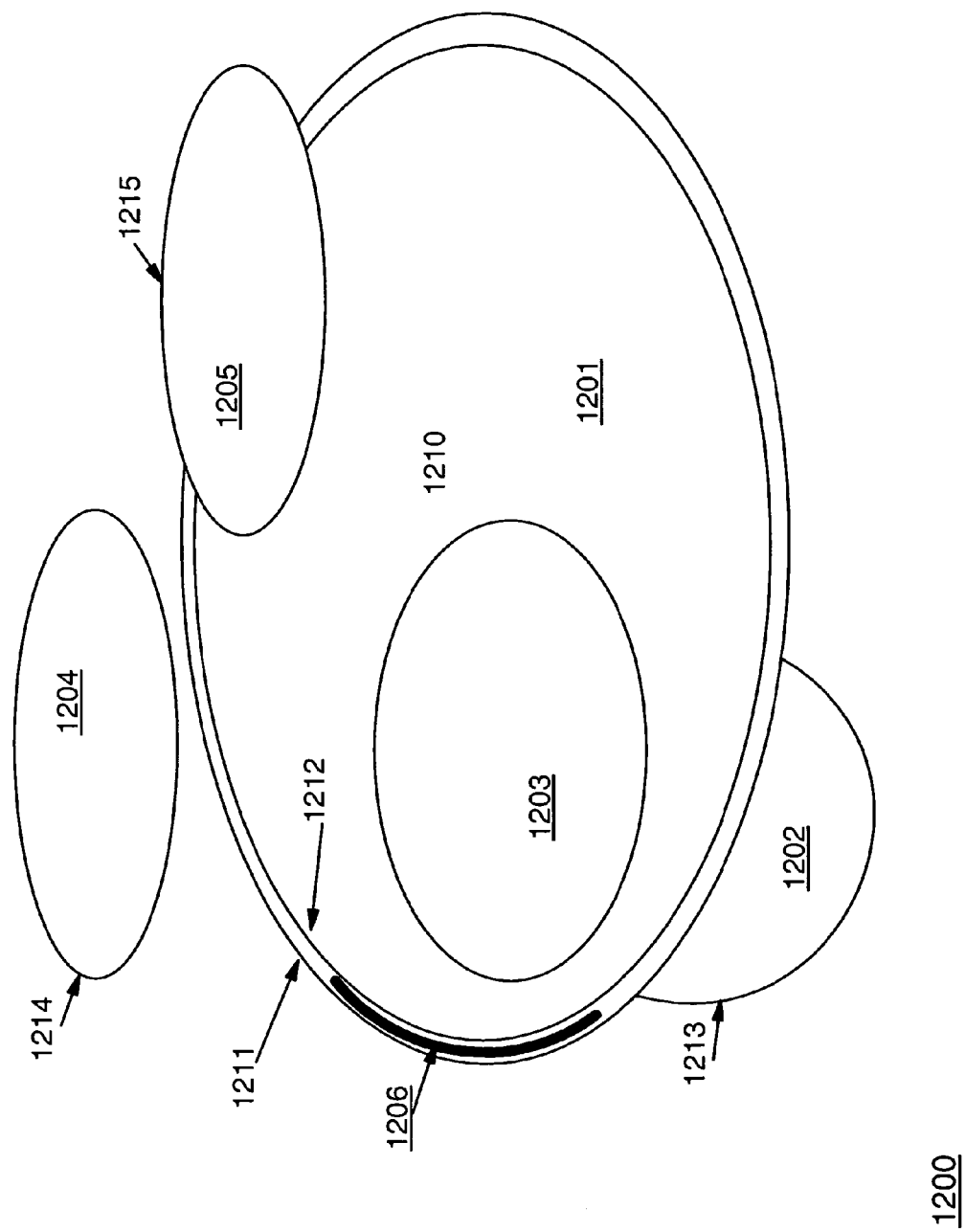
FIG. 12 is a flow depicting example ICON regions.

FIG. 12 depicts examples of implementations, shown generally at 1200, of regions according to the invention. An ICON (Widget) 1201 of any shape has an internal region 1210 bounded by an edge 1211. The ICON also has a border region bounded by the edge 1211 and an interior edge 1212. Within the border region there may be a region 1206 comprising a portion of the border region. Further, there can be an appendage region 1202 with an edge 1213 where, an internal region 1203, a region outside the ICON 1204 with edge 1214 and a region 1205 with edge 1215 that includes a portion of the icon and a portion outside the icon. Any of the ICON regions may be active in the normal mode and displayed in the normal mode. In another implementation, any region may be hidden in normal mode except when a cursor is moved within the region or a related region.

In one embodiment, the invention is a standalone program for manipulating GUI icons. It can also be implemented as a web page using HTML utilizing objects (applets), as described by the W3C Standards organization in its tech report (www.w3.org/TR/REC-html40/struct/objects.html).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method for providing an interactive icon on a user interface, the method comprising:
    defining a border region comprising a plurality of sides;
    defining a plurality of resize indicators with a first size dimension situated along each of the sides of the border region;
    displaying an icon on a user display with the border region and resize indicators that have been defined;
    determining that at least one portion of the border region has been selected by moving a pointer on an area associated with the at least one portion of the border region; and
    dynamically re-displaying, in response to the at least one portion of the border region being selected, each of the resize indicators with a second size dimension within the border region, wherein a size of the border region remains unchanged during the selection and the first size dimension being different than the second size dimension.

2. The computer implemented method of claim 1, wherein the resize indicators are initially hidden until a pointer enters the border region.

3. The computer implemented method of claim 1, further comprising:
    associating a central region with an interaction program of an application associated with the icon for user interaction with the application, the user interaction involving dragging a bar to modify a value of the application.

4. The computer implemented method of claim 1, wherein the displaying further comprises:
    presenting at a user display in a single state, the icon having the border region and central region, wherein while in the single state the border region accepting manipulating user input for an operating system and wherein while in the single state the central region accepting interaction user input for an application associated with the icon.

5. The computer implemented method of claim 1, further comprising:
    determining that the at least one portion of the border region has been selected by moving the pointer on an area associated with the at least one portion of the border region;
    dynamically changing, in response to the at least one portion of the border region being selected, a second appearance of at least the portion of the border region that the pointer has been moved into.

6. The computer implemented method of claim 1, further comprising:
    determining that a pointer has moved into at least one portion of the border region;
    dynamically associating, in response to the determining, the at least one portion of the border region with a first manipulating program of an operating system; and
    dynamically associating, in response to the determining, each of the resize indicators with a second manipulating program of the operating system.

7. The computer implemented method of claim 1, further comprising:
    determining that a pointer has moved into at least one portion of the border region; and
    dynamically displaying, in response to the determining, each of the resize indicators situated along sides of the border region associated with the at least one portion of the border region, wherein each of the resize indicators are displayed with a first size dimension.

8. The computer implemented method of claim 7, further comprising:
    determining that the at least one portion of the border region has been selected by moving the pointer on an area associated with the at least one portion of the border region;
    dynamically activating, in response to the at least one portion of the border region being selected, a first manipulation program associated with the at least one portion of the border region enabling a user to move the icon within a window by clicking and dragging on the at least one portion of the border region to re-position the icon within the window; and
    dynamically activating, in response to the at least one portion of the border region being selected, a second manipulation program associated with each of the resize indicators enabling a user to resize the icon.

9. The computer implemented method of claim 7, further comprising:
    determining that the at least one portion of the border region has been selected by moving the pointer on an area associated with the at least one portion of the border region; and
    dynamically re-displaying, in response to the at least one portion of the border region being selected, each of the resize indicators with a second size dimension.

10. A system for presenting an interactive icon, the system comprising:
    a network;
    a user computer system in communication with the network;
    a host computer system in communication with the network, the host computer system having an operating system for controlling the host computer system and for controlling applications on the host computer system, wherein a host computer system includes instructions to execute a method comprising:
        defining a border region comprising a plurality of sides;
        defining a plurality of resize indicators with a first size dimension situated along each of the sides of the border region;
        displaying an icon on a user display with the border region and resize indicators that have been defined;
        determining that at least one portion of the border region has been selected by moving a pointer on an area associated with the at least one portion of the border region; and
        dynamically re-displaying, in response to the at least one portion of the border region being selected, each of the resize indicators with a second size dimension within the border region, wherein a size of the border region remains unchanged during the selection and the first size dimension being different than the second size dimension.

11. The system of claim 10, wherein the resize indicators are initially hidden until a pointer enters the border region.

12. The system of claim 10, wherein the host system further includes instructions for:
- determining that a pointer has moved into at least one portion of the border region;
- dynamically associating, in response to the determining, the at least one portion of the border region with a first manipulating program of an operating system; and
- dynamically associating, in response to the determining, each of the resize indicators with a second manipulating program of an operating system.

13. The system of claim 10, further comprising instructions for:
- initially hiding the resize indicators are until a pointer enters the border region.

14. A computer program product for creating an interactive icon, the computer program product comprising:
- a storage medium readable by a processing circuit and storing instructions for execution by the processing circuit for performing a method on a computer having an operating system for controlling the computer and for controlling applications on the computer, comprising:
- defining a border region comprising a plurality of sides;
- defining a plurality of resize indicators with a first size dimension situated along each of the sides of the border region;
- displaying an icon on a user display with the border region and resize indicators that have been defined;
- determining that at least one portion of the border region has been selected by moving a pointer on an area associated with the at least one portion of the border region; and
- dynamically re-displaying, in response to the at least one portion of the border region being selected, each of the resize indicators with a second size dimension within the border region, wherein a size of the border region remains unchanged during the selection and the first size dimension being different than the second size dimension.

* * * * *